United States Patent [19]

Schneller

[11] Patent Number: 4,853,770
[45] Date of Patent: Aug. 1, 1989

[54] VIDEO SYSTEM FOR VIEWING MICROSCOPIC SPECIMENS

[76] Inventor: Joe Schneller, 310 E. Dairy, Monett, Mo. 65708

[21] Appl. No.: 162,646

[22] Filed: Mar. 1, 1988

[51] Int. Cl.$^4$ .............................................. H04N 7/18
[52] U.S. Cl. ........................................ 358/93; 382/6; 358/334
[58] Field of Search .................. 358/93, 107, 31, 334; 382/6; 356/39

[56] References Cited

U.S. PATENT DOCUMENTS

| | | | |
|---|---|---|---|
| 4,398,211 | 8/1983 | Young | 358/93 |
| 4,404,683 | 9/1983 | Kobayashi et al. | 382/6 |
| 4,594,608 | 6/1986 | Hatae et al. | 358/93 |
| 4,626,906 | 12/1986 | Ensor | 358/93 |
| 4,656,594 | 4/1987 | Ledley | 382/6 X |
| 4,661,863 | 4/1987 | Ichinai | 358/334 |
| 4,702,595 | 10/1987 | Mutschler et al. | 382/6 X |

Primary Examiner—James J. Groody
Assistant Examiner—Victor R. Kostak
Attorney, Agent, or Firm—Michael Yakimo, Jr.

[57] ABSTRACT

A video system for viewing microscopic specimens includes a video camera and VCR for capturing a microscopic display of the viewed specimen. The camera is modified so as to split the output signal of the camera-viewed specimen into its luminance and chroma characteristics. The split signals are delivered to a downstream VCR so as to capture the split signal on tape for subsequent recall and display.

6 Claims, 2 Drawing Sheets

VIDEO SYSTEM FOR VIEWING MICROSCOPIC SPECIMENS

BACKGROUND OF THE INVENTION

This invention relates to the marriage of a video system with a microscope so as to display the viewed specimen field of the microscope and capture a video tape and/or hard paper copy of the same.

The ideal approach to the study of cells and tissues is to observe them in their natural, living state. Technical difficulties inherent in such procedures greatly limit their practical utility such that conventional histologic methods are still used.

Existing microscopic technology is based upon the examination of a specimen fixed upon a slide. The fixing of the slide, inclusive of the staining of the specimen, results in the killing of the live organisms which are to be viewed. The Dark Field microscopic technique, which utilizes a black background, has a limited use to identification of specific types of bacteria. In Bright Field microscopy, the fixed objects are presented against a white light background.

Television cameras are used to brighten magnified images otherwise too dark to see with even a dark adapted human eye.

Optical microscopy has certain limitations attributable to the wave nature of light. Ernst Abbe showed in the 1870's that two points of brightness could be detected as two only if about a half wavelength of light (0.2 micrometer for green light) apart, and then only when observed with an oil immersion objective of highest numerical aperture (1.30).

Light microscopes are also limited in other ways. Small objects present very little contrast unless some contrasting method, such as phase contrast, anaxial illumination, interference contrast, differential interference contrast, or fluorescence microscopy, is used.

Although television cameras were first used to some advantage during the 1950's to enhance contrast of microscope images, it was not until the late 1970's that intensification cameras were used to brighten images two dark to see even with a dark adapted eye. The method is called video-intensification microscopy (VIM).

In 1981 the so-called AVEC method of video enhancement microscopy was developed and found to have widespread applications in many fields of biology and medicine. The microscope could be adjusted in ways that spoiled the image for the human eye, yet vastly improved it for a television camera with appropriate characteristics. The method of AVEC videomicroscopy increases the resolving power of the microscope twofold and the contrast several hundredfold. In addition, it provides more light intensity to the television camera and less to the specimen, so that shorter exposures of specimens to damaging light permit rapid motions to be recorded. AVEC and other advances in the digital processing of microscope images have been combined with a redesigned optical microscope to produce a hybrid instrument called a photonic microscope system.

Accordingly it is desirable to present a system which further enhances the conventional microscopic techniques for the examination of organisms which are not readily identifiable through conventional examination procedures. It is also desirable to readily recall the viewed field from tape and provide a video display and/or hard copy of the same. The system should allow for the observation of the interaction of the antibodies with foreign bacterial organisms. Furthermore the system should provide the immediate identification of microorganisms. The system should also allow for organic chemical labeling utilizing crytstalline signature patterns as well as allow the user to view the effects of intravenous or orally ingested drugs and nutritional materials.

I have found that by utilizing electronic techniques with video equipment that a unique method can be provided for exploring gerentology and tissue cell generation; viral, bacterial or parasitological interaction with healthy cells; operation and interaction of the body immune system and therapeutic dosage of pharmaceuticals inclusive of illicit drug crystalline structure. More particularly I have found that by modifying presently available video cameras, recorders, and peripheral equipment and marrying the same to conventional microscopic equipment that I can provide an enhanced video display of cells and tissues with the ability to make a video tape and/or hard copy of the viewed specimen field.

Accordingly it is a general object of this invention to provide a specimen viewing system by interacting a microscope with a video system so as to capture the display of the specimen field.

Another object of this invention is to provide a system, as aforesaid, which provides for a high degree of resolution and clarity of the viewed specimens.

Still another object of this invention is to provide a system, as aforesaid, which separates the chroma and luminance characteristics of a video signal of a viewed specimen so as to increase the viewed resolution of the same.

A particular object of this invention is to provide a system, as aforesaid, which comprises a modified video camera so as to provide for the marriage between a microscope and video system.

Another object of this invention is to provide a system with camera, as aforesaid, which splits the video output signal into chroma and luminance characteristics with selectable dB gain controls for downstream communication of a video cassette recorder.

A still further object of this invention is to provide a system with camera and VCR, as aforesaid, which has been modified to reduce the effect of color combs/filters therein so as to process a relatively weak signal while allowing a strong amount of color passthrough so as to enhance the resolution of the viewed video signal.

Another particular object of this invention is to provide a system, as aforesaid, which captures the luminance and chroma characteristics of a video signal of the viewed specimen field on a video tape.

A still further object of this invention is to provide a system, as aforesaid, which processes a weak video signal of the viewed specimen field while allowing a relatively strong amount of color passthrough so as to engage the processing circuitry of a VCR and increase the overall line resolution and clarity of the resulting video display.

A further object of this invention is to provide a system, as aforesaid, which provides a hard copy of the viewed specimen field to be made from the video tape.

Other objects and advantages of this invention will become apparent upon a reading of this specification inclusive of the claims and drawings.

DESCRIPTION OF THE PREFERRED EMBODIMENT

Figure 4:
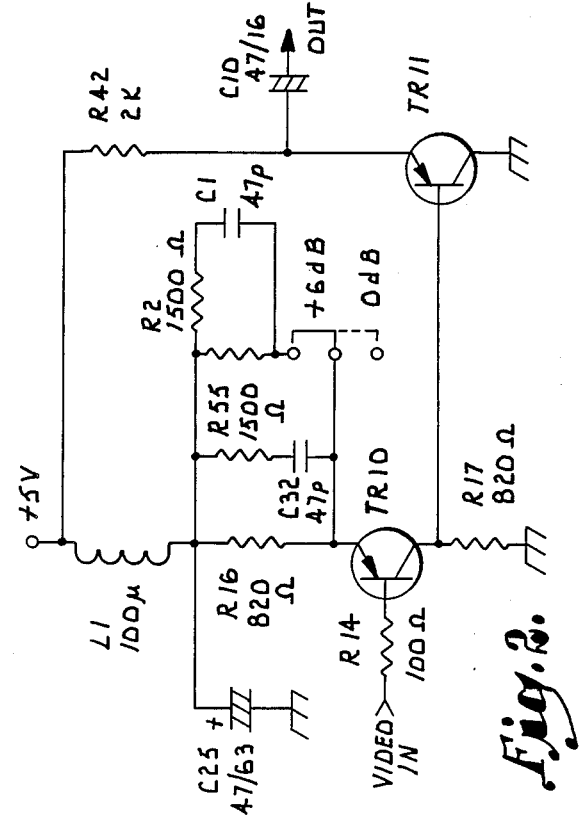
FIG. 4 is a block diagram illustrating the basic components of the video system for viewing microscopic specimens.
Figure 5:
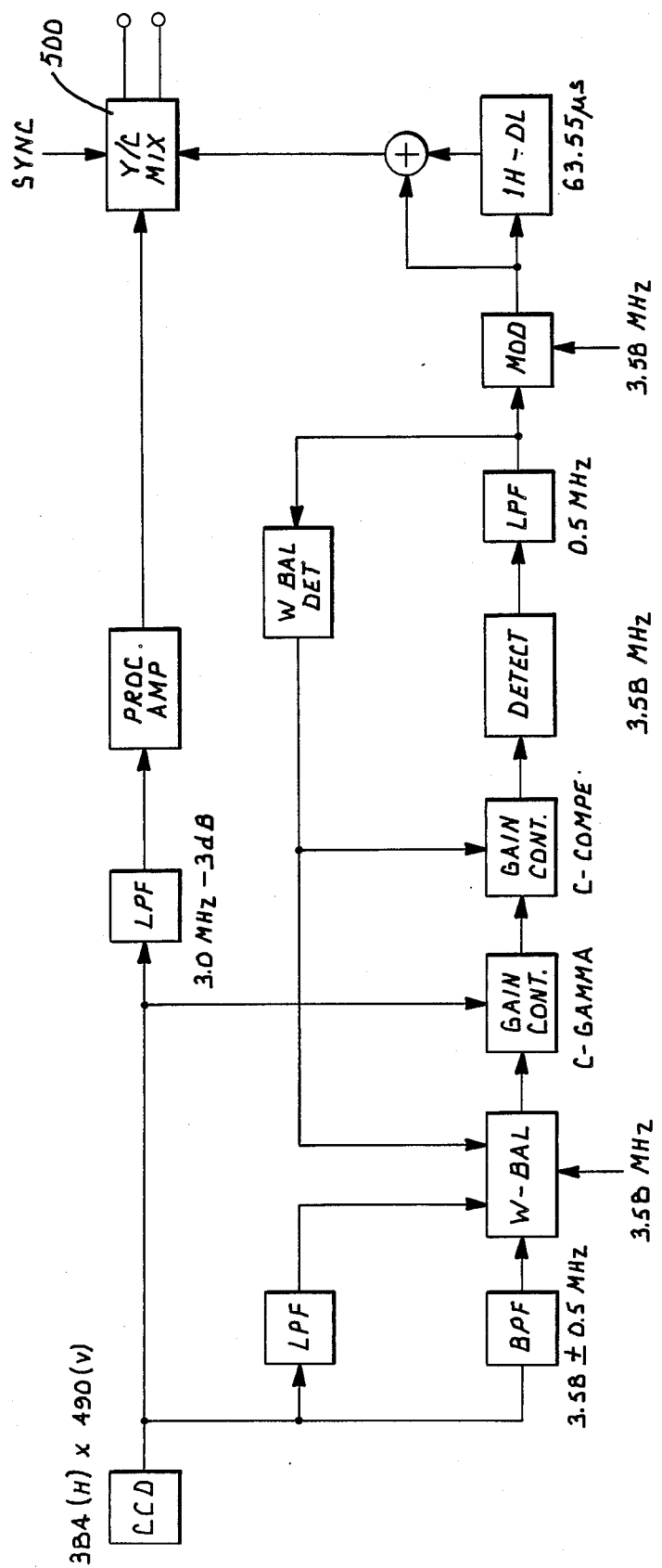
FIG. 5 is a block diagram illustrating the signal processing circuitry in a video camera.

FIG. 4 illustrates a block diagram setting forth the components of the system of my invention. In connection with the specimen to be microscopically viewed, I currently utilize a miscroscope 10 for viewing the specimen under consideration which is compatible with an associated CCD chip camera so as to present a downstream output signal carrying the characteristics of the viewed specimen. The microscope 10 is of the triocular type having standard binocular viewing pieces with an additional video camera port. A video camera 20 having a light sensitive CCD chip is associated with this camera port in a conventional manner so that the camera lens is constructively capturing the light indicative of the microscopic view of the specimen field. The CCD chip of the camera receives the light from the microscope 10 so as to normally process this signal so as to send a conventional integral chroma and luminance video signal 80 for use by a downstream VCR 50.

I currently use a NEC NC-8 CCD color camera 20 made by the NEC Corporation. The video output signal 80 normally emanates from this camera 20 at the NTSC output 24 and initiates the marriage of the video signal 80 with the remaining downstream components of the video system. The NEC NC-8 camera has the following specifications which should be considered in selecting a video camera of other types:

Imaging device : Inter-line CCD transfer imaging device×1
Picture size: 6.4 mm×4.8 mm (½inch)
Number of pixels: (Horizontal) 427 (Vertical) 492
Scanning: 2:1 interlacing
Scanning frequency: Horizontal: 15.734KHz, Vertical: 59.94 Hz
SYNC system: Internal/external synchronization (Automatic selection)
External synchronizing signal input: VBS, B.B (Black Burst), or Mix Sync
Video output: VBS: 1.0 Vp-p Image: 0.7 Vp-p, positive polarity, synchronization: 0.3 Vp-p, negative polarity 74 homes unbalanced
Signal-to-noise ratio: 47 dB (Luminance channel, standard image status, AGC: OFF)
Resolution: Horizontal: 280 lines, Vertical: 350 lines
Sensitivity: 1600 LUX, F4.0 (AGC: OFF)
Minimum subject illumination: 25 Lux,F1.4 (AGC: ON)
White balance adjustment: Manual
White balance adjustment range: 2400 degree K to 10,000 degree K
White balance remote control range: Maximum 200 m
Output using EE lens: Brilliant image signal: 1.0 Vp-p, high impedance, power supply: +9.5 V DC (Maximum 40 mA)
Lens mount: C mount
Camera mount: ¼ inch 20 UNC (Top or bottom surface)
Ambient temperature and humidity: For maintaining performance: 0 40 degree C., RH 50-70%, For maintaining operation: −10-50 degree C RH below 90%, For storage: −20-60 degree C., RH below 70%
Power source: 120 V AC±10%, 60 Hz
Power consumption: Approximately 6.5 W (9 VA or less)
External dimensions: 84 (Width)×88 (Height)×177 (Depth) mm (excluding lens mount and projection)
Weight: Approximately 1.4 kg (without lens)
Standard accessories: 5-pin plug (R03-PB5M) 1 (for EE lens), 8-pin plug (TCP8080-11-010) 1 (for AUX), Fuses (1 A) 2, Instruction manual 1

At this time the signal 80 of the viewed specimen is a relatively weak one and includes a combination of the chroma and luminance characteristics of the specimen field. The conventional color combs/filter in the camera 20 provide for a blending of the chroma characteristics of the viewed objects, in this case the microscopic specimen. These comb/filters are designed to present for a pleasing color effect to the viewer and as such normally remove some of the color characteristics from the signal.

As the viewed microscopic specimen is a relatively small one and generates a weak signal with very little luminance I separate the chroma from the luminance characteristic so that the definition of the viewed specimen field can be increased. As said, I also remove the strong color combs/filters from the camera circuitry so as to preclude undesirable blending/softening of the chroma characteristics and allow a greater amount of chroma/color passthrough. It is understood that upon removal of these color comb/filters that the remaining circuit components of the camera circuitry must be retuned or "tweaked" so as to account for component removal. Thus I pass all the color possible to the downstream components.

I also desire to separate the video signal into its chroma and luminance characteristics in order to increase the pixel density of the video output signal to a value of greater than 600 pixel density. By pixel density I mean a measure of the number of dots in a line. Thus the higher the pixel density the better the clarity of the resulting viewed signal.

Figure 1:
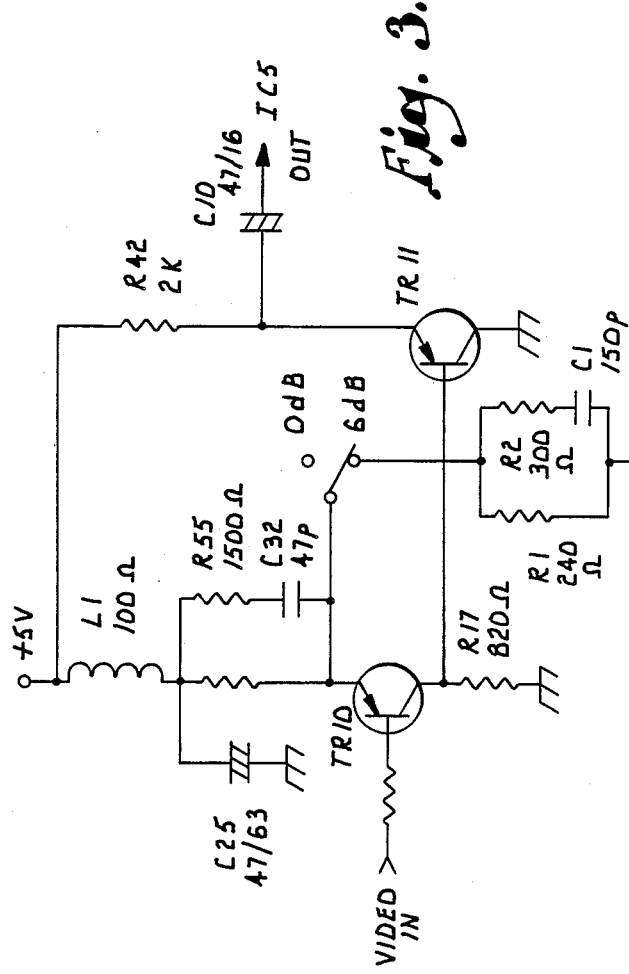
FIG. 1 is a schematic generally illustrating the modification to be made to the circuitry of the video camera so as to separate the video signal of the specimen field into its chroma and luminance characteristics.

As above stated the camera 20 is modified in order to separate the video output signal into its chroma and luminance characteristics. I currently separate the output signal of the video camera 20 at the last possible moment before exit of the video signal from the camera. Such modification is made at the Y/C mix synchronizer 500. One form of modification circuitry is as illustrated in FIG. 1. As illustrated in FIG. 1 the video signal enters the circuitry at the designated input which results in split output signals 102, 104 being delivered. As further illustrated in FIGS. 2-3 various approaches may be used to the modification of this camera so as to selectably increase the dB gain of the separate chroma (12dB) and luminance (6dB) signals. These split signals are sent downstream by means of two BNC connectors on the outside of the camera. Chroma and luminance leads extend from these connectors and respectively deliver a chroma output signal with color burst (0.3 Vpp; 75 ohm impedance) and a luminance output signal (1.0 Vpp (Video 0.7pp SYNC 0.3 Vpp); 75 ohm impedance) to downstream line inputs of the video cassette recorder 50. It is understood that upon an inspection of these circuits by one skilled in the art other circuitry can be utilized to provide for this signal separation and dB gains. Thus as shown various switches can be incorporated into the modification circuitry so as to provide for automatic gain control or dB gains of the resulting signal.

The video cassette recorder 50 that I now prefer is a Panasonic Omnivision (PV-S4764) video cassette recorder/HQ. This recorder has line inputs for reception of the split chroma and luminance signals and provides a luminance and color signal separation process of a video signal and delivery of the same to separate channels on the video heads for separate recording on different tape tracks. By earlier separating the chroma characteristics from the luminance characteristics and delivering the same to this VCR 50 via separate line inputs, these signals are processed by the VCR 50, while still triggering the line resolution clarity circuitry within the VCR, for capture of the video tape at a high pixel density and a high horizontal line resolution.

Again, various color combs/filters are in the VCR 50 to provide for color blends. I remove these strong combs/filters from the VCR 50 in order to eliminate the loss of color characteristics due to the blending effect and maintain the definition/resolution of the chroma characteristics of the viewed specimen. As such the chroma and luminance characteristics of the split video signal, as received from the modified video camera 50, are maintained even with a weak signal. It is also noted that the VCR magnetic head may be remagnetized so as to increase the clarity of the recorded signal.

After recording the split video signals on separate tracks of the tape, via the two channel VCR 50, the split signals can then be sent downstream via line inputs to a monitor 90 for concurrent viewing, such as on a Novabeam Model 100 Video Projection Monitor 90. A video copy processor such as a Mitsubishi P60U 95 receives the signals so as to provide a selectable hard copy of the tape for subsequent recall. The signals, indicative of the specimen field and as captured on the video tape, can be subsequently played back for future recall, viewing and hard copy processing. It is understood that the block diagram may be modified so that upon transfer to the processor it can bypass the same if the power is off. If the power is on the processor can then provide a hard copy indicative of the same.

Figure 2:
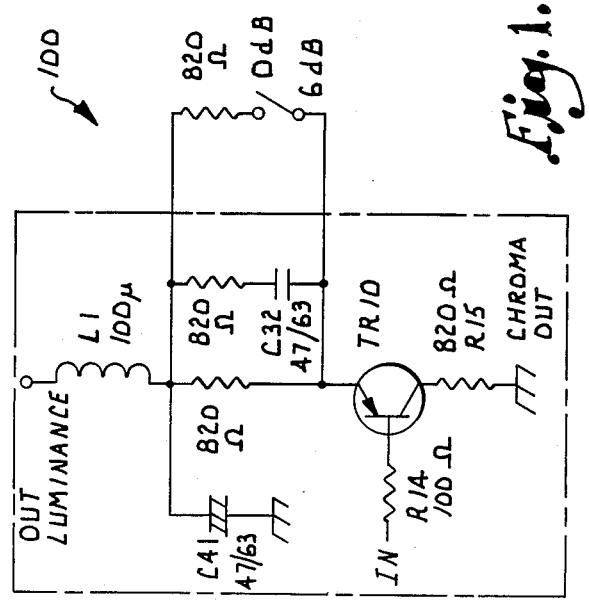
FIG. 2 is a schematic illustrating one form of circuitry modification to be made to the circuitry of the video camera so as to provide a selectable dB gain to the chroma component of split video signal.
Figure 3:
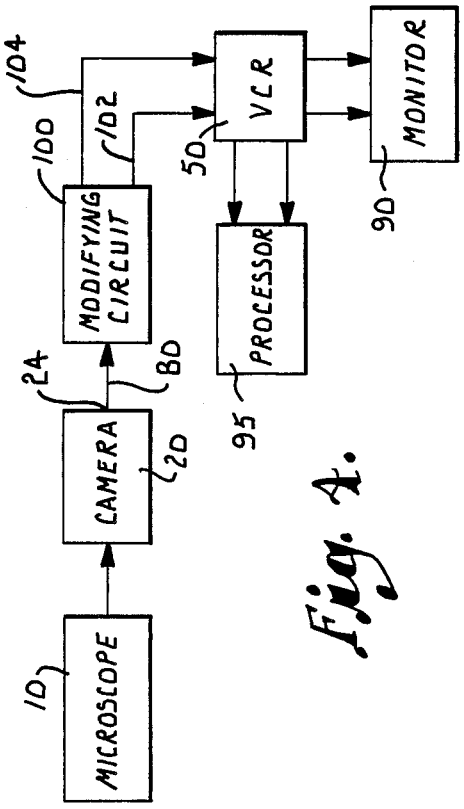
FIG. 3 is a schematic illustrating one form of circuitry modification to be made to the circuitry of the video camera so as to provide a selectable dB gain to the luminance component of the split video signal.

Accordingly, as above described, I modify the video camera as basically shown in FIG. 1 and more particularly shown in FIGS. 2 and 3 to split the luminance and chroma characteristics of the output signal (as well as add specific dB gain) from the viewed specimen and delivery of the same to a VCR 50. As I wish to increase the resolution of the viewed specimen I eliminate the strong color combs/filters in the camera 20 and VCR 50 so as to allow greater chroma passthrough and maintain the clarity and resolution of the signal indicative of the viewed specimen field. As such my system provides for efficient and effective video viewing, recall, capture and reproduction of the viewed specimen field.

Although my now preferred embodiment has been shown it is understood that my invention should not be so limited except as in the following claims and equivalents thereof.

I claim:

1. A video system for viewing a specimen comprising:

microscope means for providing a magnified view of said specimen;

means on said microscope means for associating a video camera means with said microscope means;

said video camera means having circuitry therein for receiving a signal indicative of said specimen field as viewed by said microscope means;

circuit means associated with said circuitry of said video camera means for modifying a normal integral video signal emanating from said video camera circuitry indicative of said specimen, said circuit means splitting said integral signal into a first carrying luminance characteristics of said signal and a second signal carrying chroma characteristics of said signal;

means for modifying said circuitry of said video camera means to allow a greater passthrough of said chroma characteristics of said split signal through said camera means to a downstream component;

lead means for delivering said first and second signals from said circuit means of said camera means to a downstream VCR component;

VCR means having circuitry therein for receiving said first and second indicative signals and recording the same onto respective first and second tracks of a video tape;

means for modifying said circuitry of said VCR means to allow a greater passthrough of said chroma characteristics of said split signal through said VCR prior to recording said signals onto said tracks of said video tape.

2. The video system in claim 1 wherein said circuit means includes gain control means for selectably varying the amount of dB gain associated with at least one of said characteristics of said signal.

3. The video system as in claim 1 further comprising; a video monitor associated with said VCR for viewing said first and second signals indicative of said specimen field.

4. The video systems as in claim 2 further comprising; a copy processor associated with said VCR for transferring said first and second signal onto paper indicative of said specimen field.

5. The video system in claim 1 wherein said modifying means of said video camera means circuitry comprises the removal of color combs and filters in said camera circuitry in a manner to delimit blending of chroma characteristics of said signal passing therethrough.

6. The video system in claim 1 wherein said modifying means of said VCR means circuitry comprises the removal of color combs and filters in said camera circuitry in a manner to delimit blending of chroma characteristics of said signal passing therethrough.

* * * * *

UNITED STATES PATENT AND TRADEMARK OFFICE
CERTIFICATE OF CORRECTION

PATENT NO. : 4,853,770
DATED : August 1, 1989
INVENTOR(S) : Joe Schneller

It is certified that error appears in the above—identified patent and that said Letters Patent is hereby corrected as shown below:

Column 6, line 21, claim 1: After the word "first" insert --signal-- therefor.

Signed and Sealed this

Third Day of November, 1992

Attest:

DOUGLAS B. COMER

Attesting Officer

Acting Commissioner of Patents and Trademarks